United States Patent
Deeman et al.

(10) Patent No.: US 7,218,470 B2
(45) Date of Patent: May 15, 2007

(54) EXPOSURE DOSE CONTROL OF ROTATING ELECTRON BEAM RECORDER

(75) Inventors: Neil N. Deeman, Alamo, CA (US); Christopher J. Formato, Brentwood, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 260 days.

(21) Appl. No.: 10/449,727

(22) Filed: Jun. 2, 2003

(65) Prior Publication Data

US 2004/0021976 A1    Feb. 5, 2004

Related U.S. Application Data

(60) Provisional application No. 60/385,521, filed on Jun. 3, 2002.

(51) Int. Cl.
*G11B 21/02* (2006.01)
(52) U.S. Cl. .................... 360/75; 369/126; 430/296
(58) Field of Classification Search .......... 360/75, 360/77.02, 77.03, 78.04; 264/1.1, 1.31; 369/44.26, 369/44.37, 47.5, 53.28, 53.26
See application file for complete search history.

(56) References Cited

U.S. PATENT DOCUMENTS

| | | | | |
|---|---|---|---|---|
| 5,130,970 A | * | 7/1992 | Ohta | .................. 369/100 |
| 5,170,382 A | * | 12/1992 | Yamada et al. | .......... 369/13.24 |
| 5,279,775 A | * | 1/1994 | Thomas et al. | ............ 264/1.33 |
| 6,850,377 B2 | * | 2/2005 | Hashi et al. | ................ 360/17 |
| 2002/0034152 A1 | | 3/2002 | Kumasaka et al. | ........ 369/272 |
| 2004/0001415 A1 | | 1/2004 | Formato et al. | |

\* cited by examiner

*Primary Examiner*—Andrew L. Sniezek
(74) *Attorney, Agent, or Firm*—McDermott Will & Emery LLP (57) ABSTRACT

In a beam lithography operation the relative motion between a work piece and the exposure beam produces variations in linear speed at different regions of the work piece surface. For example, if a disk work piece rotates with a constant angular velocity (CAV) relative to the beam, the linear surface speed relative to the beam impact point increases in proportion to increasing radial distance of that point from the center of the disk. To provide uniform exposure dose, the duty cycle of pulses of the exposure beam are varied in accord with radial distance.

19 Claims, 7 Drawing Sheets

*Fig. 8A* Two Pulse Strategy — 93% Exposure at OD

*Fig. 8B* 50% Exposure at ID

*Fig. 7A* Three Pulse Strategy — 87% Exposure at OD

*Fig. 7B* 50% Exposure at ID

Date=5/15/02    Wafer # 53    Beam Current 56.2 nA    3 Pulses per servo mark
                              Track Pitch  109 nm

| AFM File # | WP400 | Radius | CLV | Track Pitch nm | Depth nm | Pit Width nm | Total width nm | Duty Cycle (%) | Electrical DC % | Radius mm | Rotation RPM | Linear Velocity m/s | Duty Cycle / Velocity | Comments |
|---|---|---|---|---|---|---|---|---|---|---|---|---|---|---|
| 6 | WP400 | OD Band9 0Deg | | 400 | 99 | 420 | 1230 | 34 | 100% | 89.75 | 359.7 | 3.381 | 0.30 | Shorter overall pulse time |
|  | WP400 | OD Band8 0Deg | | 400 | 93 | 645 | 1221 | 53 | 85% | 89.55 | 359.7 | 3.373 | 0.25 |  |
| 7 | WP400 | OD Band7 0Deg | | 400 | 96 | 545 | 1240 | 44 | 75% | 89.35 | 359.7 | 3.366 | 0.22 | Slightly under exposed |
| 8 | WP400 | OD Band6 0Deg | | 400 | 29 |  |  |  | 65% | 89.15 | 359.7 | 3.358 | 0.19 | Under exposed |
|  | WP400 | OD Band5 0Deg | | 400 | 25 |  |  |  | 55% | 88.95 | 359.7 | 3.351 | 0.16 | Under exposed |
|  | WP400 | OD Band4 0Deg | | 400 | 21 |  |  |  | 45% | 88.75 | 359.7 | 3.343 | 0.13 | Under exposed |
|  | WP400 | OD Band3 0Deg | | 400 | 14 |  |  |  | 35% | 88.55 | 359.7 | 3.335 | 0.10 | Under exposed |
|  | WP400 | OD Band2 0Deg | | 400 | 8 |  |  |  | 25% | 88.35 | 359.7 | 3.328 | 0.08 | Under exposed |
|  | WP400 | OD Band1 0Deg | | 400 | 12 |  |  |  | 15% | 88.15 | 359.7 | 3.320 | 0.05 | Under exposed |
|  | WP400 | ID Band9 0Deg | | 400 | No Resist |  |  |  | 100% | 44.75 | 359.7 | 1.686 | 0.59 | Over exposed |
|  | WP400 | ID Band8 0Deg | | 400 | No Resist |  |  |  | 85% | 44.55 | 359.7 | 1.678 | 0.51 | Over exposed |
|  | WP400 | ID Band7 0Deg | | 400 | No Resist |  |  |  | 75% | 44.35 | 359.7 | 1.671 | 0.45 | Over exposed |
|  | WP400 | ID Band6 0Deg | | 400 | No Resist |  |  |  | 65% | 44.15 | 359.7 | 1.663 | 0.39 | Over exposed |
|  | WP400 | ID Band5 0Deg | | 400 |  |  |  |  | 55% | 43.95 | 359.7 | 1.655 | 0.33 | Over exposed |
| 9 | WP400 | ID Band4 0Deg | | 400 | 102 | 322 | 596 | 54 | 45% | 43.75 | 359.7 | 1.648 | 0.27 |  |
|  | WP400 | ID Band3 0Deg | | 400 | 97 | 234 | 586 | 40 | 35% | 43.55 | 359.7 | 1.640 | 0.21 |  |
| 10 | WP400 | ID Band2 0Deg | | 400 | 23 |  |  |  | 25% | 43.35 | 359.7 | 1.633 | 0.15 | Under exposed |
|  | WP400 | ID Band1 0Deg | | 400 | 12 |  |  |  | 15% | 43.15 | 359.7 | 1.625 | 0.09 | Under exposed |

EXPOSURE DOSE CONTROL OF ROTATING ELECTRON BEAM RECORDER

RELATED APPLICATION

This application claims the benefit of U.S. Provisional Application No. 60/385,521 entitled "Exposure Control of Rotating Electron Beam Recorder" filed on Jun. 3, 2002, the disclosure of which is entirely incorporated herein by reference.

FIELD OF THE INVENTION

The present subject matter relates to techniques and equipment for using beam lithography to lay down patterns on a disk medium, for example, for tracks of servo patterns to be formed on a surface of a master for the production of a magnetic disk of a hard disk drive, where the exposure energy is controlled to compensate for differences in speed of the disk surface relative to the exposure beam during the track forming process by moderating the energy of the beam to insure uniform exposure dose.

BACKGROUND OF THE INVENTION

Electron beam lithography equipment typically includes a beam column, acting as the generator for producing the exposure beam, and a moveable support table for moving the work piece to be exposed by the beam past the beam. As the surface of the work piece passes under the beam, the beam is modulated to form desired marks on the surface of the disk. Such electron beam lithography equipment, for example, has been suggested for use in forming servo marks on the master for the production of magnetic disks used in hard disk drives. However, application of beam lithography to rotating disk shaped work pieces presents certain problems, as will be discussed below.

A magnetic disk drive, such as a hard disk drive, stores data on one or more disks coated with a magnetic medium. For read/write purposes, the surface of the magnetic medium carries a number of generally parallel data tracks, which on a disk type medium, are arranged concentrically with one another about the center of the disk. An actuator arm positions a transducer or "head" over a desired track, and the head writes data to the track or reads data from the track. As the disk rotates, the actuator arm moves the head in a radial direction across the data tracks under control of a closed-loop servo system, based on position information or "servo data," which is stored within dedicated servo fields of the magnetic medium of the disk. The servo fields can be interleaved with data sectors on the disk surface or can be located on a separate disk surface that is dedicated to storing servo information. As the head passes over the servo fields, it generates a readback signal that identifies the location of the head relative to the center line of the desired track. Based on this location, the servo system moves the actuator arm to adjust the head's position so that it moves toward a position over the desired track and/or a desired location within the track of current interest. Systems for forming the servo tracks on a master for the production of magnetic disks have used both stepped translation mechanisms with laser beams and continuous translation mechanisms with electron beams.

Generally, beam lithography equipment controls the velocity of movement of the work piece under the beam to obtain a desired exposure dose. However, for rotating disk type applications, such as servo mark formation on master disks, it is advantageous to rotate the disk work piece under the beam and to move the disk work piece radially under the beam, during exposure. Assuming the beam remains stationary, the combination of the rotation and radial translation of the disk work piece causes the beam to expose a spiral pattern. In another application (US Publication No. 2004/0001415; entitled Manufacture of Concentric Patterns From Spiral Source), the inventors have developed a technique using cyclical deflection of the beam in synchronization with disk rotation, to convert the spiral pattern to a series of concentric rings. The beam is modulated on and off during such movement of the disk to form a series of desired servo marks along the spiral or along the concentric rings.

During such beam lithography processing of disk work pieces, it is advantageous to rotate the work piece at a constant rotational speed (constant angular velocity—CAV). This provides coherence between successive passes (or tracks). Good coherence, or low track-to-track phase error, is a requirement for good servo track writing so as to support good drive servo performance, for example in disk drive applications.

However, by using CAV during exposure of a rotating disk work piece, the linear velocity of the disk surface at the point under the beam increases proportionally with the radius from the center of disk rotation. Since the linear speed varies with radius, the resulting dosage also varies, since by the beam energy and the linear speed determine the dosage at any given point. As speed increases, the dosage per unit area decreases. Such variation in dosage results in unwanted variation in the feature geometry.

Figure 11:
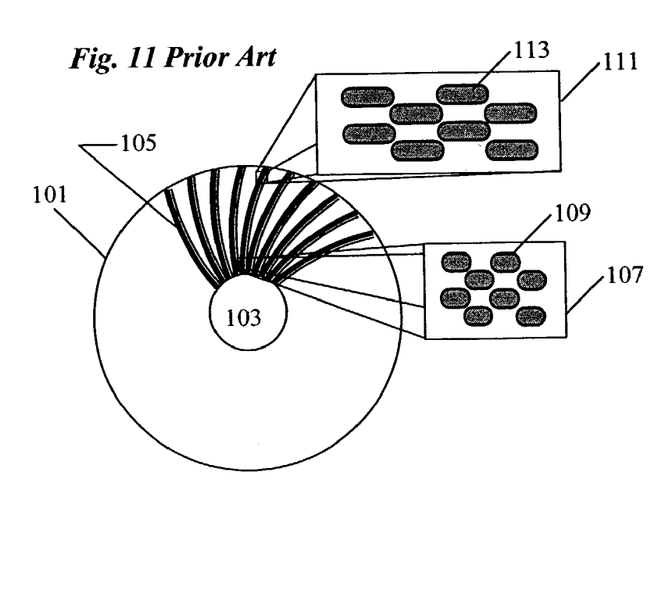
FIG. 11 illustrates a pattern of exposure of servo marks on a disk surface using constant angular velocity rotation of the disk past the exposure beam, as produced by a prior art beam lithography technique.

It may be helpful to consider FIG. 11 as an example. The drawing shows a recording disk 101, e.g. a resist coated silicon wafer, having a center opening 103. As the disk 101 rotates and translates relative to the recording beam, the beam is modulated to form servo marks in the photoresist surface, in patterns 105.

The enlarged view of region 107 shows a representative area of the disk work piece, and thereby makes visible a number of the actual marks 109, in a region relatively near the center opening 103. In the region 107, the radial distance from the center of the disk 101 is relatively small. In a similar fashion, the enlarged view of region 111 shows a representative area of the disk, and thereby makes visible a number of the actual marks 113, in a region relatively near the outer edge of the disk 101. In the region 111, the radial distance from the center of the disk 101 is relatively large.

Because the angular rotation rate is constant (e.g. constant RPM), the linear velocity of the disk surface increases at points further from the center of disk rotation. The greater the radius from the center, the greater the circumference at that distance, and the higher will be the linear speed relative to the exposure by the beam. As a result, a greater arc of the disk surface passes under the beam during a unit of exposure time. Any unit of exposed area therefore receives less exposure dose because it is moving faster (because at a greater radius from the center).

Figure 12:
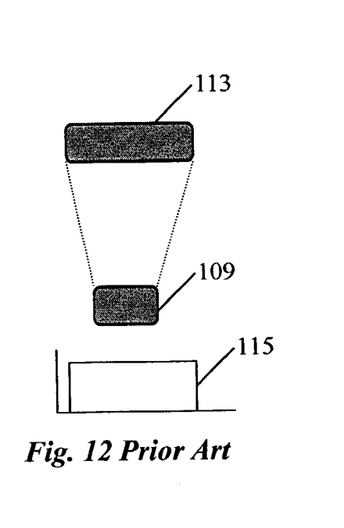
FIG. 12 shows enlarged marks from the disk processed in FIG. 11, at different radial distances, in relation to an exemplary beam format modulation pulse.

FIG. 12 shows the timing of the actual beam-on pulse 115, in relation to the exposed areas 109 and 113 in the regions 107 and 111. The on-time of the beam used to expose each mark is the same, as represented by the high state of the pulse 115. However, as noted above, the linear velocity increases with radius, since the disk 101 rotates at a constant angular velocity during processing. As a result, as the linear speed increases (higher radius), the length of the marks increases (compare 109 to 113). The two different lengths of marks 109, 113 illustrate the linear change in feature length, from outer diameter (OD) to inner diameter (ID), when marks are formed using a constant substrate rotation rate and a constant mark exposure time. Under such a processing scenario, actual exposure dose is effectively stretched over a longer mark area as radius increase. Hence, the exposure dose in a given unit of surface area decreases as radius increases (or the dose in a given unit of surface area increases with decreasing radius).

Like many other beam lithography applications, servo pattern formation on a master for the production of magnetic disks requires uniform exposure doses. That is to say, the exposure dose in any exposed unit of area of the master disk should be held substantially constant across the exposure surface.

It might be possible to vary the electron beam current to compensate for variations in linear velocity. Unfortunately, variation of the beam current adversely affects the spot size and again produces unwanted changes in the recorded feature geometry.

A need therefore exists for a technique to adapt the beam lithography approach, for example using the rotation and translation of the disk work piece, e.g. a resist coated silicon wafer forming a master disk, so that the lithography produces a substantially uniform exposure dosage for marks regardless of the location (e.g. radially) on the disk surface, without causing other unwanted changes in the recorded feature geometry.

SUMMARY OF THE INVENTION

The concepts disclosed herein alleviate the above noted problems with using a stationary beam in combination with disk rotation and translation to produce servo patterns or the like on a disk work piece, by controlling the exposure to compensate for variations in relative speed or velocity. In a constant angular velocity (CAV) type process, the exposure compensates for the linear velocity variation due to different radial distances from the center of rotation. As a result, the beam lithography processing can produce substantially uniform exposure dosages.

A process for forming a pattern of marks on a surface of a work piece entails generating an exposure beam modulated in accord with the desired pattern of marks intended for formation on the work piece. The beam and/or the work piece move(s), so as to produce a relative motion, between the work piece and the modulated exposure beam, while applying the modulated beam to expose the surface of the work piece and thereby form the actual marks. During application of the modulated exposure beam to the surface of the work piece, the duty cycle of the modulated exposure beam is controlled in accord with a variation of speed of the relative motion between the work piece and the modulated exposure beam. This control maintains a substantially constant exposure dose.

The exposure of the workpiece provides this desired pattern of marks. For example, the control of the duty cycle maintains the feature length of the desired marks yet adjusts duty cycle to provide substantially uniform exposure.

In the disclosed examples, the work piece is a disk, such as a silicon wafer substrate coated with a photoresist layer as might be used for disk master; and the marks to be formed on the disk master comprise representations of servo marks of a magnetic recording disk. The exemplary processing equipment includes a turntable supporting the disk work piece and an electron beam column for generating the exposure beam. In such examples, the relative motion includes both rotational movement and translational movement. The modulation defines a feature dimension, typically length. The duty cycle control involves controlling duty cycle of the modulation of the exposure beam in accord with radial distance of point of impact of the exposure beam on the surface of the disk work piece from the center the disk work piece, to maintain a substantially the constant exposure.

In a typical electron beam system, a format signal modulates the beam (e.g. on and off) so that the beam exposes the desired pattern of individual marks on the rotating work piece. In one example, to achieve uniform exposure dosage, the beam format signal is modulated with a signal of higher frequency; and the duty cycle (ratio of signal high to complete signal cycle) of the higher frequency modulation signal is varied, in proportion to the radial distance of the point of exposure to the beam from the disk center, and thus in proportion to the linear velocity of the disk surface at that point. The frequency of this modulation is chosen high enough so as not to adversely impact the geometry of recorded features in the downtrack direction. The frequency is low enough, however, to meet the rise time requirements of the blanking circuit in the electron beam column.

In another example, the duty cycle control entails generating a beam format modulation signal comprising a series of pulses and dividing the pulses by a pre-determined number, to form sub-pulses. The duty cycle of the sub-pulses is controlled in accord with the radial distance, to form a beam modulating signal; and the signal formed by the sub-pulses modulates the exposure beam during processing of the surface of the disk. Examples are discussed that divide each pulse of the normal format modulation signal into 2–5 sub-pulses. The control of the duty cycle of the sub-pulses insures that the modulation of the exposure beam still provides the desired pattern of exposed features on the disk, for example, with marks of the desired feature length(s).

An exemplary apparatus for implementing such a mark pattern forming operation might include a beam recording system. The system produces a relative motion between the disk work piece and a recording beam, as the recording beam is modulated to expose a surface of the disk in a desired pattern. The apparatus also includes means for controlling exposure by the recording beam of regions on the surface of the disk so as to maintain a substantially uniform exposure dose for the marks formed on the surface of the disk work piece.

The foregoing and other features, aspects and advantages of the present invention will become more apparent from the following detailed description of the present invention when taken conjunction with the accompanying drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 10 is a table showing parameters and results of experimental electron beam recording of servo marks on disk wafers in accord with exemplary techniques described herein.

DETAILED DESCRIPTION OF THE INVENTION

The concepts disclosed herein address and solve problems related to providing beam exposure patterns on a disk medium, with uniform exposure dose, for example, as used for forming servo patterns or the like on a disk work piece. In the examples, beam modulation sub-pulse duty cycle is controlled in accord with radial distance and/or linear speed relative to the exposure beam.

Figure 1:
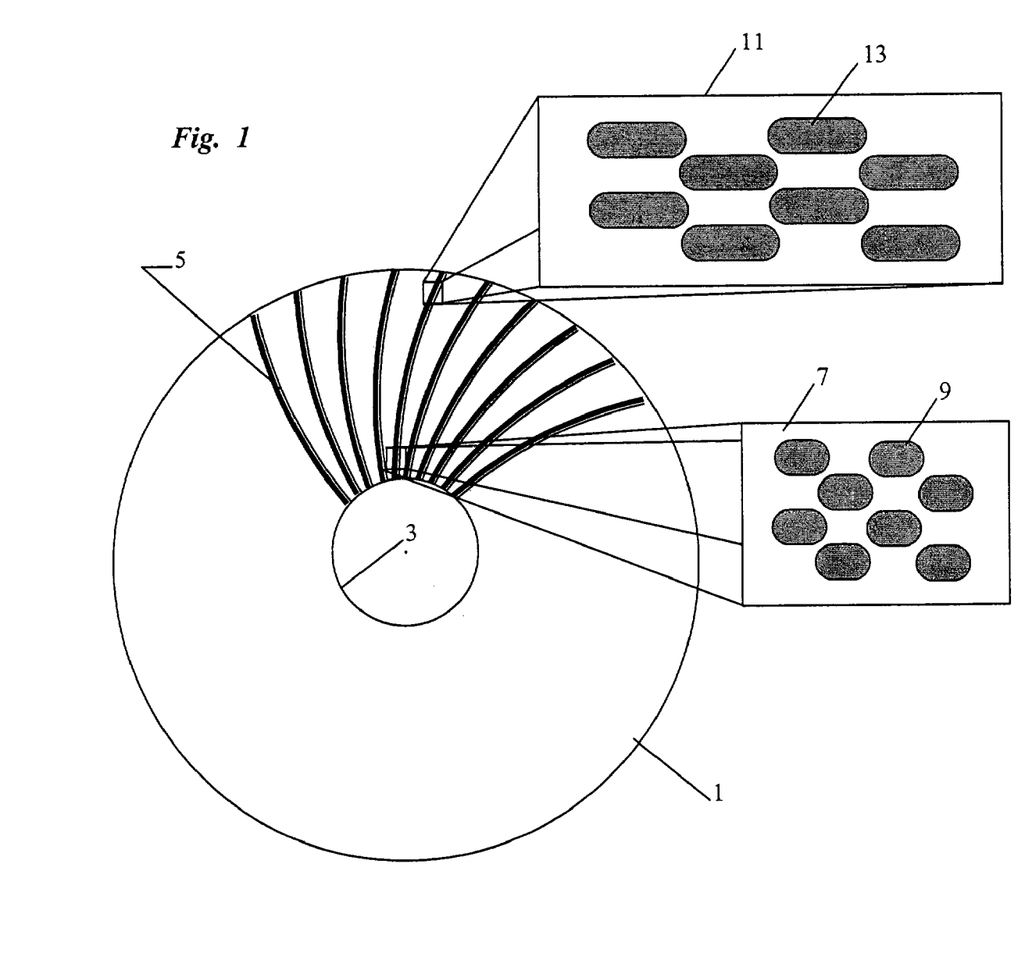
FIG. 1 illustrates a pattern of exposure of servo marks on a disk surface using constant angular velocity rotation of the disk past the exposure beam, and details of the length and area of resultant servo marks produced at the disk outer diameter and inner diameter.

Reference now is made in detail to the examples illustrated in the accompanying drawings and discussed below. FIG. 1 illustrates a pattern of exposure of servo marks formed by beam lithography on a surface of a disk work piece 1. Although the electron beam recording technology may be used on other types of disks, for discussion purposes, the example of disk 1 is a resist coated silicon wafer as might be used as a master disk for hard drive media manufacture. The disk 1 has an inner opening 3 defining the inner diameter (ID) of the recording surface. The outer periphery of the disk 1 defines an outer diameter (OD) of the recording surface.

Marks are formed on the disk surface by a beam recording system, an example of which is described later. The recording system produces a relative motion between the disk work piece and a recording beam. During this movement, the beam impacts the surface; and the system modulates the beam to expose a surface of the disk in a desired pattern. In the example discussed in detail, the disk 1 rotates and translates relative to the recording beam, and the beam is modulated to form servo marks in the photoresist surface, in patterns 5. Typically, the recording system rotates the disk 1 with a constant angular velocity (CAV).

The enlarged view of region 7 shows a representative area of the disk, and thereby makes visible a number of the actual marks 9, in a region relatively near the center opening 3. In the region 7, the radial distance from the center of the disk 101 is relatively small. In a similar fashion, the enlarged view of region 11 shows a representative area of the disk, and thereby makes visible a number of the actual marks 13, in a region relatively near the outer edge of the disk 1. In the region 11, the radial distance from the center of the disk 1 is relatively large.

Figure 2:
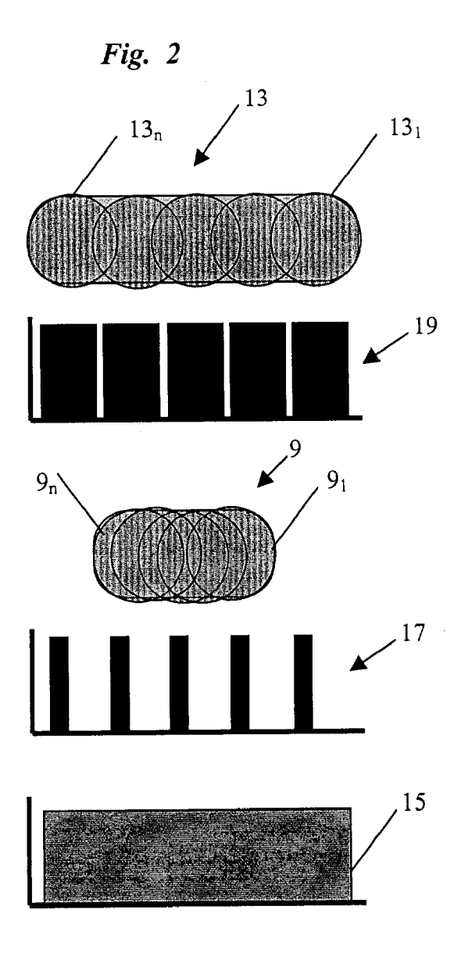
FIG. 2 depicts examples of sub-pulses of the format modulation signal and the changes to the duty cycle of the sub-pulses needed to maintain uniform exposure dose to the corresponding servo marks formed on the surface of the disk of FIG. 1.

Because the angular rotation rate is constant (e.g. constant RPM), the linear velocity of the disk surface increases at points further from the center of disk rotation. The greater the radius from the center, the greater the circumference at that distance, and the higher will be the linear speed relative to the exposure by the beam. As a result, a greater arc of the disk surface passes under the beam during a unit of exposure time. FIG. 2 shows a representative exposure pulse 15 (one unit of exposure time), representing the amplitude or output energy of the beam. Although the length of the marks will still vary with radial distance, as shown at 9 and 13 in FIGS. 1 and 2, the dosage is maintained relatively constant by varying the duty cycle of the sub-pulses within the beam-on pulse 15, as represented by the pulses 17 and 19 shown in FIG. 2.

In a typical electron beam system, a format signal modulates the beam (e.g. on and off) so that the beam exposes the desired pattern of individual marks on the rotating work piece. To achieve uniform exposure dosage, the beam format signal is modulated with a signal of higher frequency or is divided, to form a series of higher frequency sub-pulses. The duty cycle (ratio of signal high to complete signal cycle) of the higher frequency modulation signal or the sub-pulses is varied, in proportion to radial distance or the linear velocity of the disk surface at the point of exposure to the beam. The frequency of this modulation is chosen high enough so as not to adversely impact the geometry of recorded features in the downtrack direction. The frequency is low enough, however, to meet the rise time requirements of the blanking circuit in the electron beam column. In the examples, the modulation/dividing of the pulses produces 2 to 5 variable duty cycle pulses for each mark pulse of the format signal.

The frequencies may change with each format design. As an example, if the frequency of the normal beam format modulation signal is 2.9 MHz, the frequency of the sub-pulse signal (using two sub-pulses per modulation pulse) is 11.4 MHz.

FIG. 2 shows the timing of the beam sub-pulses, with varying duty cycle, in relation to the exposed areas 9 and 13 in the regions 7 and 11. As noted above, the linear velocity increases with radius, since the disk 101 rotates at a constant angular velocity during processing. As a result, as the linear speed increases (higher diameter), the length of the marks increases (compare 9 to 13). The two different lengths of marks 9, 13 illustrate the linear change in feature length, from outer diameter (OD) to inner diameter (ID), when marks are formed using a constant substrate rotation rate and a constant mark exposure time.

If exposed with constant-on beam pulses 15, the exposure dose increases as radius decreases, as discussed above relative to FIGS. 11 and 12. Ideally, the exposure dose should be held constant across the exposure surface. In the approach of FIGS. 1 and 2, however, each exposure pulse 15 is divided into five sub-pulses, and the duty cycle of the sub-pulses is decreased with radius so as to maintain a constant exposure dose across the exposure surface.

In the example, near the inner diameter (e.g. in region 7), the format modulation signal produces a beam output one time interval that takes the form of five short duty cycle emission pulses 17. Rather than forming a continuous mark, the pulses 17 form a series of exposure spots $9_1$ to $9_n$ (n=5 in the example), which together form the overall servo mark 9. Near the outer diameter (e.g. in region 11), the format modulation signal for one time interval produces five longer duty cycle beam pulses 19. The beam pulses 19 form a series of exposure spots $13_1$ to $13_n$ (n=5 in the example), which together form the overall servo mark 13. As the duty cycle is decreased, so is the amount of time the exposure source is on, thus the overall exposure dose is decreased. However, the exposed area of mark 9 is less than that of mark 13. For a given unit of surface area, the exposure dose is substantially the same in the mark 9 as in the mark 13.

Those skilled in the art will recognize that the processing technique of FIGS. 1 and 2 can utilize a variety of different types of beam lithography equipment, as well as with the structure and operation of such lithography equipment. However, to provide all readers with a full understanding of the processing technique, it may be helpful to consider one specific example.

Figure 3:
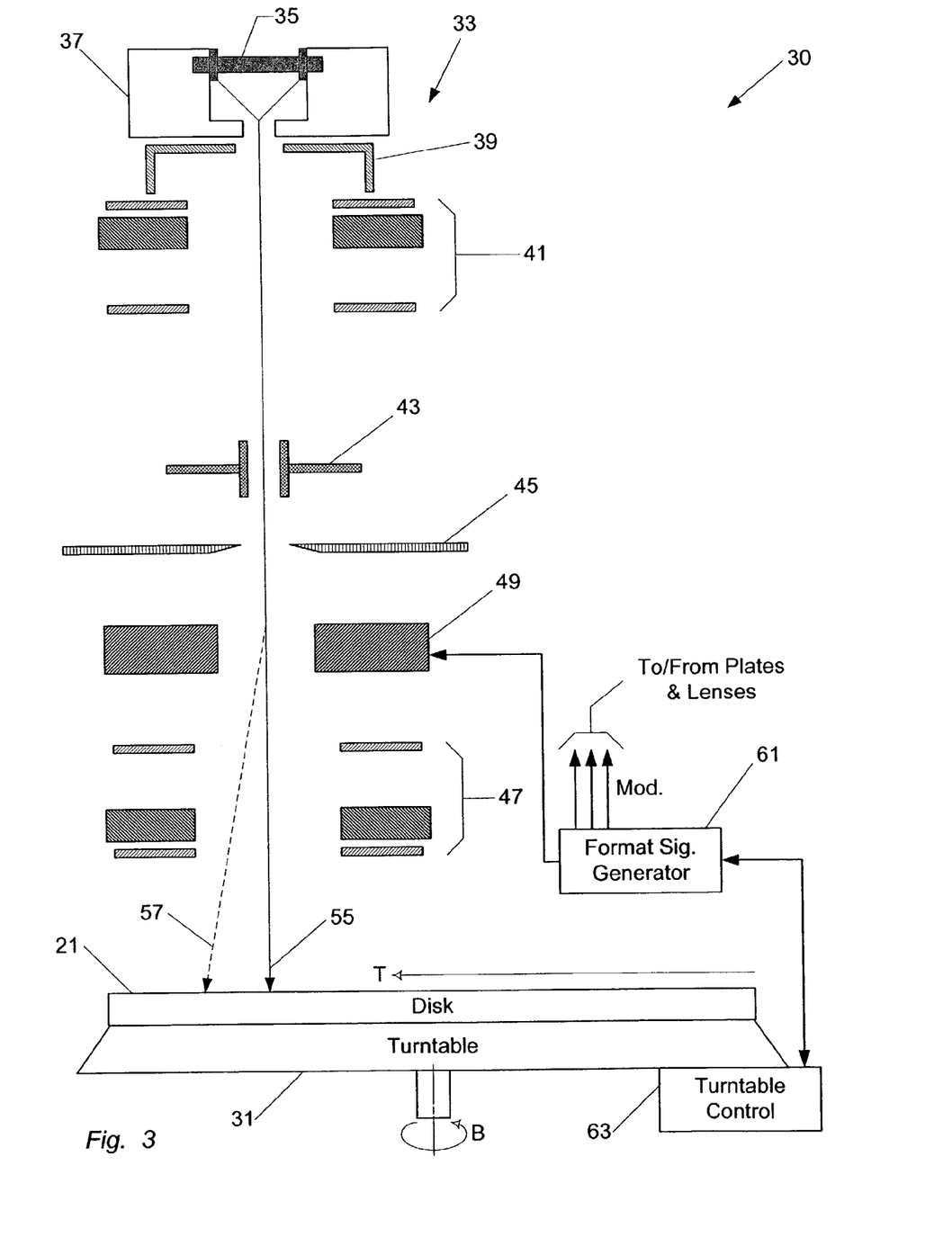
FIG. 3 is a side view of an electron beam type beam recorder system, for forming servo marks on a disk work piece, with elements of the electron beam device (column) shown in cross-section.

FIG. 3 depicts an exemplary electron beam recording system 30, which may be used to implement the processing technique of FIG. 1. The system 30 includes a turntable 31 and an electron beam column 33 for generating and manipulating the recording beam. The turntable 31 supports the disk 1 for rotation in the direction B about its vertical axis, and for lateral translation in the direction T, beneath the beam emitted by the column 33. Examples of such an electron beam recording system are available from Unaxis Nimbus Limited. It is assumed that those skilled in the art are generally familiar with the structure and operation of available electron beam column devices, however, for completeness of the discussion, a summary description thereof is provided.

In the example, the electron beam column 33 includes a thermal field emission (TFE) electron source 35 and a suppression assembly 37. The column may also include electron extractor 39. When appropriate voltages are applied to the TFE source 35, the suppression assembly 37 and the extractor 39, these elements cooperate to generate a stream of electrons for further processing in the column 33. The stream of electrons passes through a first triple element lens 41, then through blanking plates 43 and a blanking aperture 45. The stream of electrons then passes through one or more additional lenses, represented for example, by the second triple lens 47 in the drawing.

The beam position may be controlled by application of a voltage to the deflection plates 49. The precise location of the deflection plates in the column, relative to the other elements of the column, is not critical. In the example, the deflection plates are between the blanking aperture 45 and the lens 41, although other column structures use other arrangements.

Without deflection, at the start of a disk rotation, the beam travels in a perpendicular fashion as shown at 55, from the e-beam column 33 to the resist surface on the disk 1. Applying a deflection voltage to the plates 49 causes deflection of the beam. The polarity of the voltage determines the direction of the deflection. The amplitude of the voltage controls the magnitude of angular deflection of the beam and thus the linear displacement of the beam at a given distance from the column, for example, at the distance to the resist layer on the surface of the disk 1. A deflected beam output is represented by the dotted line 57 in FIG. 3. Typically, the angle and thus the linear displacement are proportional to the voltage applied across the plates 49. A DC voltage will produce a constant deflection, and a variable voltage produces a proportionally varying angle of deflection of the beam.

Hence, with deflection, the beam travels at an angle as shown at 57, and the angle (and thus the linear offset on the surface of the disk 1) is responsive to the voltage across the two plates 49. In the illustrated disk processing application, the direction of deflection is along a radius of the disk, which is in the cross track direction with respect to features recorded in a spiral or concentric pattern on the disk 1.

If the beam position is constant, rotation and translation of the disk 1 under the beam causes the beam spot to trace a spiral on the surface of the disk. In the example, the spiral would begin at an outer edge of the disk 1 and wind inward to the edge of the central opening of the disk.

By applying a ramped voltage to the deflection plates 49 during each disk rotation, a spiral pattern can be deflected into a pattern of concentric tracks (each comprising a plurality of exposed marks). Throughout each successive rotation, the amplitude of the ramp and the attendant increase in magnitude of the deflection is proportional to the spiral's deviation from concentricity, so that the exposure during the rotation forms one circular track of the desired marks. Hence, the ramp signal applied to the plates 49 cyclically deflects the electron beam during the successive rotations of the disk. The cyclical deflection during each respective rotation of the disk starts from an originating level of deflection at the start of the respective rotation (0 in the example), and the ramp driven deflection increases linearly during each rotation by an amount substantially equal to one track pitch by the end of the respective rotation. A more detailed discussion of such circular track formation may be found in the inventors' other application (US Publication No. 2004/0001415; entitled Manufacture of Concentric Patterns From Spiral Source). Translation of the disk 1 past the beam, during such deflection, causes the system to form a series of circular tracks on the disk 1, starting near the outer edge and working inward until near the edge of the inner opening.

The shapes of and voltages of the signals applied to the elements of column 33 serve to focus and shape the stream of electrons into a modulated beam of a desired shape and having a desired energy level for a particular application. For example, a set of signals applied to the elements of the column 33 causes the column to generate a modulated beam for forming servo patterns of particular size and depth at locations on the surface of the disk 1. The drawing in FIG. 3 shows the beam traveling through the column 33 as a straight line, for convenience of illustration. In actual operation, the beam would converge and diverge as it passes through the various elements of the column 33, in order to focus on a sample on the turntable 31 in a desired manner.

The electron beam recording system 30 also includes a format signal generator 61, for generating the various signals used by the electron beam column 33 to modulate and deflect the beam and thus format the patterns being exposed on the disk 1. The formatter 61 essentially comprises circuitry forming one or more signal generators, for producing the various signals applied to the components of the column 30 to produce the desired beam.

One example of a signal produced by the generator 61 is the format modulation signal (or beam "format" signal) for application to the blanking plates 43, which controls the energy level of the electron beam and thus the exposure of the recorded pattern. A control 63 controls the rotational speed and possibly the translational movement of the turntable 31. The format signal generator 61 provides an encoder signal to the turntable control 63, to regulate the rotational operations of the turntable 31, and the control 63 may provide one or more feedback signals to the generator 61 indicating turntable position and/or speeds. For example, the turntable control may provide an index signal each time a mark or feature on the turntable or disk passes a reference point. The index signal provides information regarding speed of rotation. For example, the number of index pulses per minute indicates the number of revolutions per minute (RPM). The time between pulses of the index signal represents the period of one rotation. The angle between rotation start point (e.g. 12 o'clock) and the reference point is a known constant. Hence, the index can also be used to determine start and end points of successive rotations.

Figure 4:
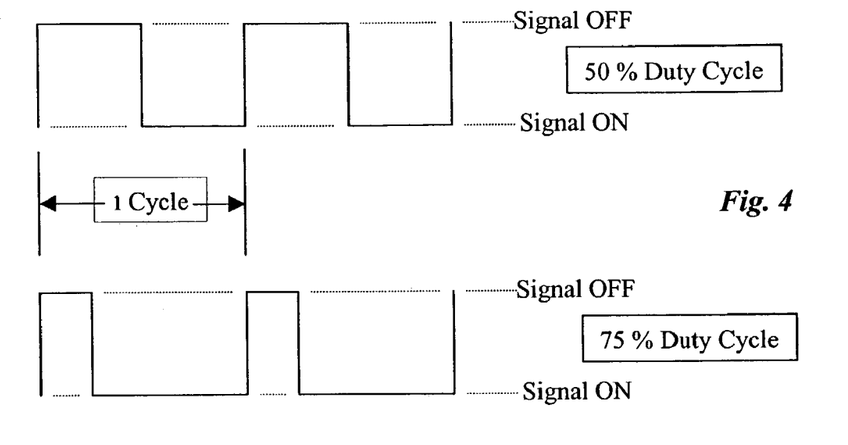
FIG. 4 is a simplified signal diagram useful in explaining duty cycle and variations in duty cycle.

FIG. 4 is a simple signal diagram useful in explaining aspects of the duty cycle manipulation applied to the beam format modulation signal. Duty cycle is the ratio of the time that a signal is on to the time to complete one signal cycle. In the examples of FIG. 2, the beam-ON occurred when the beam emissions 17 or 19 were high, for ease of understanding. When operating an electron beam lithography system 30 (FIG. 3), the beam signal ON occurs when the signal is high, but the blanking signal on plates 43 is low. In the simplified signal examples shown in FIG. 4, the blanking signal ON (beam emission) occurs when the signal is low.

Hence, the duty cycle of the format modulation signal applied to the blanking plates 43 is the ratio of the time that the format modulation signal is low (beam ON) to the time to complete one signal cycle. The top signal line of FIG. 4 shows a 50% duty cycle, in which the format modulation signal is low for the second half of each signal cycle. The lower signal line of FIG. 4 shows a 75% duty cycle, in which the format modulation signal is low for one quarter of each signal cycle.

Figure 5:
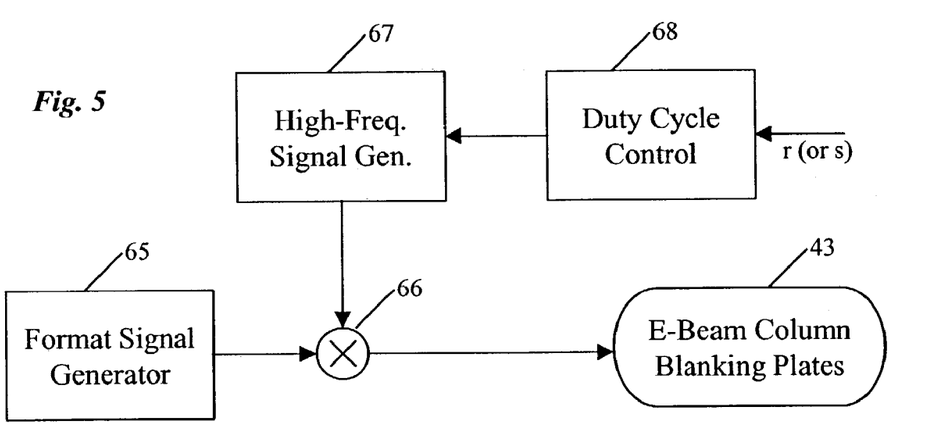
FIG. 5 is a simplified functional block diagram of an arrangement for controlling modulation of a format signal with a higher frequency signal having a variable duty cycle.

FIG. 5 is a simple block diagram of a system for combining the format modulation signal with a higher frequency signal, to produce higher frequency sub-pulses, and vary the duty cycle of the sub-pulses, as may be implemented as part of the generator 61. In this example, a format signal generator 65 generates the beam modulation signal in the normal manner. The ON cycles of the signal correspond to servo marks in the pattern desired for the disk 1. However, instead of driving the blanking plates 43 directly, the format signal generator 65 supplies the signal to a modulator 66. The modulator may take the form of a mixer or of an appropriate logic gate. A generator 67 produces a higher frequency signal, for example, having a frequency 4–10 times that of the signal from the format signal generator 65 (produces 2–5 sub-pulses for each pulse of the signal from the format signal generator 65). A control circuit 68, responsive to the radial distance (r) or the linear surface velocity or speed(s) regulates the duty cycle of the high-frequency signal produced by generator circuit 67. The radial distance r or speed s could be a measured value; or one or both of these control parameters could be derived from processing time, from a start time, based on the known angular velocity and/or disk translation velocity.

The modulator 66 modulates the beam format signal from generator 65 with the controlled higher frequency signal from generator 67. The modulation result, which is applied from 66 to the blanking plates 43, is a signal having a number of sub-pulses for each pulse in the original format signal from the generator 65. Control of the duty cycle of the high-frequency signal, in proportion to the radial distance or linear velocity provides uniform exposure of the marks on the disk surface. The frequency of this modulation is chosen high enough so as not to adversely impact the geometry of recorded features in the downtrack direction. The frequency is low enough, however, to meet the rise time requirements of the blanking circuit in the electron beam column 30.

Figure 6:
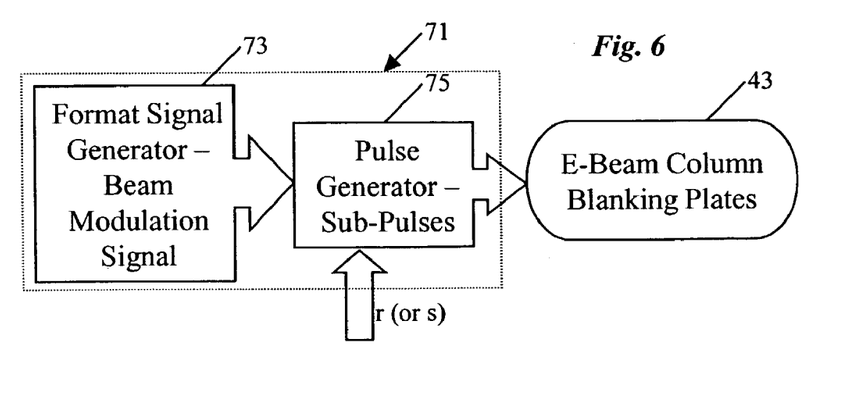
FIG. 6 is a flow chart useful in explaining the logic for dividing pulses of a format signal into variable duty cycle sub-pulses, in an alternate modulation controller.

FIG. 6 illustrates an alternate approach to generating the blanking control signal with the variable duty cycle. In this example, the logic 71 is part of the circuitry of the format signal generator 61 used to drive the blanking plates 43 in the electron beam column 30, in order to implement an example of the processing technique of FIGS. 1 and 2. As shown in this flow chart, the logic 71 includes a format signal generator section 73 that generates the beam modulation signal in the normal manner. The ON cycles of the pulses of the signal correspond to servo marks in the pattern desired for the disk 1. The modulation signal, however, drives a pulse generator section 75 that essentially divides each ON pulse into a series of sub-pulses. The resulting sub-pulse signals drive the blanking plates 43 of the electron beam column. The logic 75 varies the duty cycles of the sub-pulses as a function of radial distance r (or linear surface speed s), so as to maintain substantially constant exposure dose per unit area, over the entire surface of the disk 1. A variety of known hardware and processor-software techniques may be used to implement the logic 75, so as divide the ON pulses into sub-pulses and vary the duty cycles of the sub-pulses and provide the desired constant exposure dose.

Figure 7A:
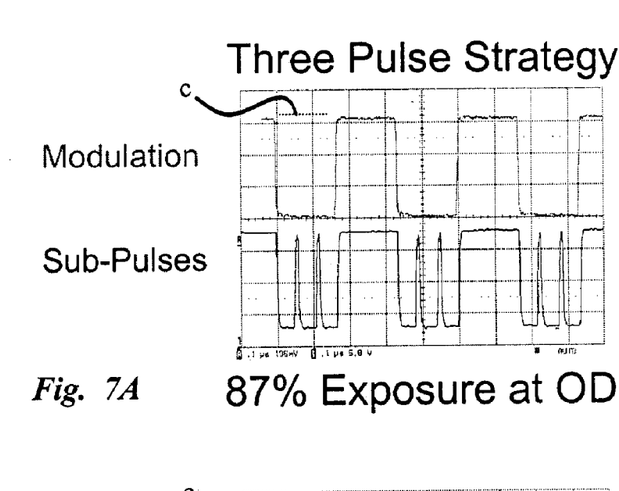
FIGS. 7A and 7B are signal trace diagrams representing a three pulse strategy for forming sub-pulses from pulses of a beam format modulation signal, for outside diameter exposure and inside diameter exposure, respectively.
Figure 7B:
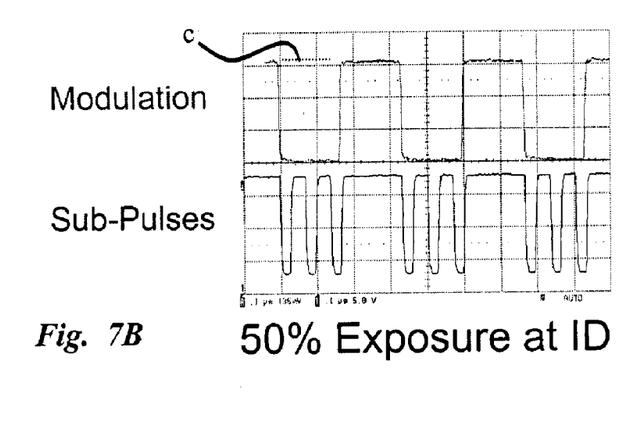
Figure 8A:
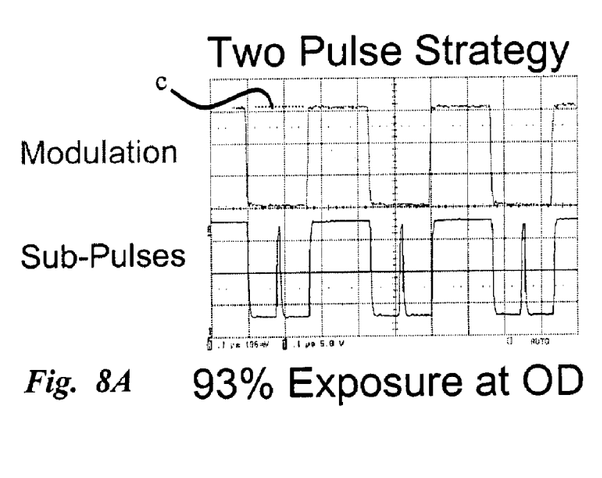
FIGS. 8A and 8B are signal trace diagrams representing a two pulse strategy for forming sub-pulses from pulses of a beam format modulation signal, for outside diameter exposure and inside diameter exposure, respectively.
Figure 8B:
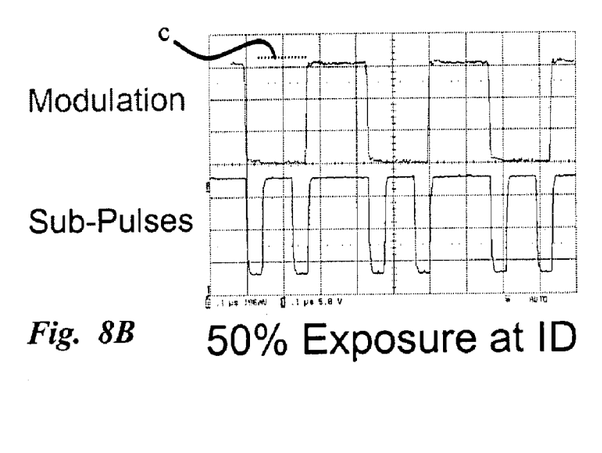

A number of different sub-pulse strategies may be used to vary the beam pulse duty cycle. The example of FIG. 2 used five sub-pulses for each desired mark (corresponding to each overall ON cycle of the beam). FIGS. 7 (A and B) and 8 (A and B) are actual signal traces showing the modulation signal and the sub-pulse signals for two different strategies. The signals shown in FIGS. 7A, 7B illustrate a three sub-pulse strategy; whereas the signals shown in FIGS. 8A, 8B illustrate a two sub-pulse strategy. Here, one cycle c corresponds the time that the beam would normally be ON if there were no sub-pulses. In this example, the exposure source turns ON when the modulation (blanking) signal is low. A reduction in sub-pulse duty cycle can be seen when comparing the OD and ID traces.

As shown in FIGS. 7A, 7B each ON portion (low) of each pulse of the format modulation signal (top line) is divided into three sub-pulses. Essentially, a series of three negative-going sub-pulses are generated in response to each falling edge of the modulation signal. In FIG. 7A, the sub-pulses provide 87% exposure in a region at or near the outside diameter (OD) of the disk 1. In FIG. 7B, the sub-pulses provide 50% exposure in a region at or near the inside diameter (ID) of the disk 1.

As shown in FIGS. 8A, 8B each ON portion (low) of each pulse of the format modulation signal (top line) is divided into two sub-pulses. Essentially, each falling edge of the modulation signal triggers generation of two negative-going sub-pulses. In FIG. 8A, the sub-pulses provide 93% exposure in a region at or near the outside diameter (OD) of the disk 1. In FIG. 8B, the sub-pulses provide 50% exposure in a region at or near the inside diameter (ID) of the disk 1.

Returning to FIG. 6, the format signal generator 73 supplies the beam modulation signal, as seen in the upper traces of FIGS. 7A to 8B. However, instead of being used to modulate the exposure beam directly, beam modulation signal is used to trigger the pulse generator 75, which outputs the sub-pulses, as seen in the lower signal traces of FIGS. 7A to 8B. It is the duty cycle of these sub-pulses that is reduced with radius (or linear velocity) to control the exposure dose. The sub-pulses are used to drive the blanking plates 43 of the electron beam column 30, to effectively turn the beam ON and OFF according to the desired exposure pattern and dosage.

Those skilled in the art will recognize that the signal processing examples shown in FIGS. 5 and 6 may be implemented as hard-wired circuits or as program logic in a programmable processor.

Figure 9:
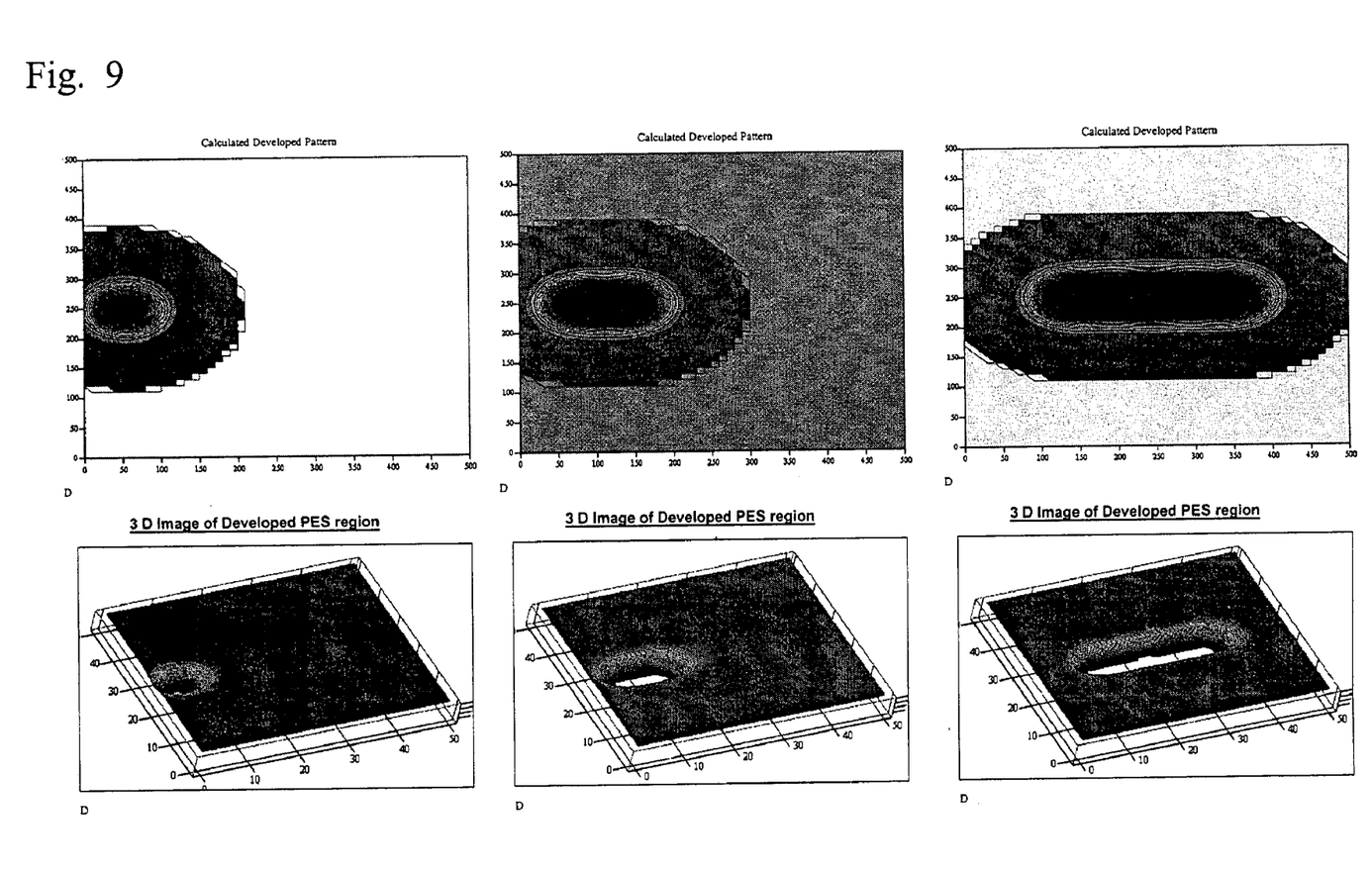
FIG. 9 illustrates graphic modeling of marks formed by the disclosed integrated exposure and development techniques.

The effect of the duty cycle variation scheme discussed above has been modeled using an integrated exposure and development model. The result from a 3 sub-pulse simulation is shown in FIG. 9. These results were calculated at 10 mm, 20 mm and 40 mm radius using a superimposed duty cycle of 21.3%, 42.6% and 85.1% respectively. The duty cycle % column of FIG. 10 contains data based on physical measurements of the features in the circumferential (downtrack) direction. This duty cycle % represents the ratio of the length of the feature to the length of the feature+the length of the land area between the features. The electrical DC % is the duty cycle of the sub-pulse signal. In the table, the electrical DC % is the ratio of the time the signal is on to the time of one complete cycle, which corresponds to the % duty cycle of the sub-pulse signal described above.

Additionally, we have performed an experimental electron beam recording whereby a servo pattern was recorded with a 3 sub-pulse pattern at two different radial bands and at various duty cycles. The results are shown in FIG. 10.

It is clearly seen that outside the nominal exposure dose either the resist remains unchanged (under exposed) or is completely washed away during development (over exposed). From the two radial bands, the nominal exposure conditions were met at the values shown in table 1.

| Radius mm | Duty Cycle % |
|---|---|
| 44 | 45 |
| 88 | 85 |

This clearly shows that the method of varying the duty cycle to maintain substantially constant exposure dosage works over the surface area of the disk recording medium.

The ranges for duty cycle %, for areas near OD and areas near ID, can be affected by the ratio of the ID to the OD, resist sensitivity and rotational speed of the substrate that carries the resist surface. For example, if the pattern OD=50 mm and the ID=25 mm, the ratio is 1:2 or 50%. If the optimum exposure dose at a given rotational speed occurs at 100% DC at the OD, then the expected optimum DC at the ID is 50% (50% of 100%). However, if the optimum exposure dose occurred at 60% DC at the OD, then the expected optimum DC at the ID is 30% (50% of 60%). Now, if the ID is reduced to 10 mm, then the expected optimum DC at the ID is 12% (20% of 60%).

Those skilled in the art will recognize that the technique described above has a wide range of applications and may be varied in many ways, yet retain the principle concepts. For example, the technique is applicable to beam lithography processing of a wide variety of different types of disk work pieces. Also, the beam may be an electron beam, a laser beam or any other type of controllable beam usable in lithography type processing.

Although the present subject matter has been described and illustrated in detail, it is to be clearly understood that the same is by way of illustration and example only and is not to be taken by way of limitation, the scope of the claims being limited only by the terms of the appended claims.

What is claimed is:

1. A method of forming a pattern of marks on a surface of a disk work piece, comprising:
    generating an electron beam modulated in accord with a desired pattern of marks to be formed on the disk work piece;
    producing relative motion, between the disk work piece and the modulated electron beam, while applying the modulated electron beam to the surface of the disk work piece to form the marks; and
    controlling duty cycle of the modulated electron beam in accord with a variation of speed of the relative motion, between the disk work piece and the modulated electron beam,
    wherein the step of controlling the duty cycle comprises controlling the duty cycle of the modulated electron beam in accord with radial distance of point of impact of the electron beam on the surface of the disk work piece from the center of the disk work piece in such a manner that the duty cycle is smaller for smaller radial distance and is larger for larger radial distance, to maintain a substantially constant electron exposure dose for marks to be formed on the disk work piece.

2. The method of claim 1, wherein:
    the modulation of the electron beam defines length of each mark;
    the relative motion comprises rotational and translational relative motion, between the disk work piece and the modulated electron beam; and
    the step of controlling the duty cycle in accord with the radial distance comprises decreasing the duty cycle of the modulated electron beam as the radial distance of point of impact of the electron beam on the surface of the disk work piece from the center of the disk work piece decreases.

3. The method of claim 2, wherein the disk work piece comprises a silicon wafer substrate covered with a photoresist layer, and the marks to be formed comprise servo marks.

4. The method of claim 2, wherein the step of controlling duty cycle of the modulated electron beam comprises:
    generating a beam format modulation signal of a first frequency, in accord with a pattern of the marks to be formed on the disk work piece;
    modulating the beam format signal with a signal of a second frequency, higher than the first frequency, to form a beam modulating signal; and
    controlling a duty cycle of the beam modulating signal in accord with the radial distance; and
    applying the beam modulating signal to modulate the electron beam, while applying the modulated electron beam to the surface of the disk.

5. The method of claim 4, wherein the beam modulating signal is applied to beam blanking plates so as to modulate the electron beam.

6. The method of claim 2, wherein the step of controlling duty cycle of the modulated electron beam comprises:
    generating a beam format modulation signal comprising a series of pulses, in accord with a pattern of the marks to be formed on the disk work piece; and
    dividing the pulses by a pre-determined number, to form sub-pulses;
    controlling a duty cycle of the sub-pulses in accord with the radial distance, to form a beam modulating signal; and applying the beam modulating signal to modulate the electron beam, while applying the modulated electron beam to the surface of the disk.

7. The method of claim 6, wherein the pre-determined number is in a range from 2 to 5.

8. A master comprising the disk work piece having a pattern of marks formed on a surface of the disk work piece by the method of claim 1.

9. A beam recording system for forming a pattern of marks on a surface of a disk, comprising:
a beam generator, for generating an electron beam;
a turntable, for rotating the disk relative to the electron beam, wherein there is also a translational movement radially of the disk relative to the electron beam; and
a modulation controller for controlling modulation of the electron beam applied to the surface of the disk to provide a desired pattern of marks,
wherein the modulation controller varies duty cycle of the modulation in accord with radial distance of point of impact of the electron beam on a surface of the disk from the center the disk in such a manner that the duty cycle is smaller for smaller radial distance and is larger for larger radial distance, to maintain a substantially constant electron exposure dose while providing the desired pattern marks on the disk.

10. The system of claim 9, wherein the modulation controller comprises:
means for generating a beam format signal of a first frequency, in accord with a pattern of the marks to be formed on the disk;
means for modulating the beam format signal with a signal of a second frequency, higher than the first frequency, to form a beam modulating signal; and
means for controlling a duty cycle of the beam modulating signal in accord with the radial distance; and
means for applying the beam modulating signal to modulate the electron beam, while applying the modulated electron beam to the surface of the disk.

11. The system of claim 10, wherein the modulation controller comprises:
means for generating a beam format modulation signal comprising a series of pulses, in accord with a pattern of the marks to be formed on the disk; and
means for dividing the pulses by a pre-determined number, to form sub-pulses;
means for controlling a duty cycle of the sub-pulses in accord with the radial distance, to form a beam modulating signal; and
means for applying the beam modulating signal to modulate the electron beam, while applying the modulated exposure beam to the surface of the disk.

12. A method of forming a pattern of marks on a surface of a disk work piece, comprising:
generating an exposure beam modulated in accord with a desired pattern of marks to be formed on the disk work piece;
producing rotational and translational relative motion between the disk work piece and the modulated exposure beam, while applying the modulated exposure beam to the surface of the disk work piece to form the marks, the modulation of the exposure beam defining length of each mark; and
controlling duty cycle of the modulated exposure beam in accord with a variation of speed of the relative motion between the disk work piece and the modulated exposure beam based on radial distance of point of impact of the exposure beam on the surface of the disk work piece from the center the disk work piece for all marks while providing exposure of the desired pattern of marks on the disk work piece, wherein the step of controlling duty cycle of the modulated exposure beam comprises:
(a) generating a beam format modulation signal of a first frequency, in accord with a pattern of the marks to be formed on the disk work piece;
(b) modulating the beam format signal with a signal of a second frequency, higher than the first frequency, to form a beam modulating signal; and
(c) controlling a duty cycle of the beam modulating signal in accord with the radial distance; and
(d) applying the beam modulating signal to modulate the exposure beam, while applying the modulated exposure beam to the surface of the disk.

13. The method of claim 12, wherein the exposure beam comprises an electron beam, and the beam modulating signal is applied to beam blanking plates so as to modulate the exposure beam.

14. A master comprising the work piece having a pattern of marks formed on a surface of the work piece by the method of claim 12.

15. A method of forming a pattern of marks on a surface of a disk work piece, comprising:
generating an exposure beam modulated in accord with a desired pattern of marks to be formed on the disk work piece;
producing rotational and translational relative motion between the disk work piece and the modulated exposure beam, while applying the modulated exposure beam to the surface of the disk work piece to form the marks, the modulation of the exposure beam defining length of each mark; and
controlling duty cycle of the modulated exposure beam in accord with a variation of speed of the relative motion between the disk work piece and the modulated exposure beam based on radial distance of point of impact of the exposure beam on the surface of the disk work piece from the center the disk work piece for all marks while providing exposure of the desired pattern of marks on the disk work piece, wherein the step of controlling duty cycle of the modulated exposure beam comprises:
(a) generating a beam format modulation signal comprising a series of pulses, in accord with a pattern of the marks to be formed on the disk work piece; and
(b) dividing the pulses by a pre-determined number, to form sub-pulses;
(c) controlling a duty cycle of the sub-pulses in accord with the radial distance, to form a beam modulating signal; and
(d) applying the beam modulating signal to modulate the exposure beam, while applying the modulated exposure beam to the surface of the disk.

16. The method of claim 15, wherein the pre-determined number is in a range from 2 to 5.

17. A master comprising the work piece having a pattern of marks formed on a surface of the work piece by the method of claim 15.

18. A beam recording system for forming a pattern of marks on a surface of a disk work piece, comprising:
a beam generator, for generating an exposure beam;
a turntable, for rotating the disk relative to the exposure beam, wherein there is also a translational movement radially of the disk work piece relative to the exposure beam; and a modulation controller for controlling exposure modulation of the beam applied to the surface of the disk to provide a desired pattern of marks, wherein:

the modulation controller varies duty cycle of the exposure modulation in accord with radial distance of point of impact of the exposure beam on a surface of the disk work piece from the center the disk work piece, to maintain a substantially constant exposure dose while providing the desired pattern of marks on the disk work piece, and the modulation controller comprises:

means for generating a beam format signal of a first frequency, in accord with a pattern of the marks to be formed on the disk work piece;

means for modulating the beam format signal with a signal of a second frequency, higher than the first frequency, to form a beam modulating signal; and means for controlling a duty cycle of the beam modulating signal in accord with the radial distance; and means for applying the beam modulating signal to modulate the exposure beam, while applying the modulated exposure beam to the surface of the disk.

19. A beam recording system for forming a pattern of marks on a surface of a disk work piece, comprising:

a beam generator, for generating an exposure beam;

a turntable, for rotating the disk relative to the exposure beam, wherein there is also a translational movement radially of the disk work piece relative to the exposure beam; and a modulation controller for controlling exposure modulation of the beam applied to the surface of the disk to provide a desired pattern of marks, wherein:

the modulation controller varies duty cycle of the exposure modulation in accord with radial distance of point of impact of the exposure beam on a surface of the disk work piece from the center the disk work piece, to maintain a substantially constant exposure dose while providing the desired pattern of marks on the disk work piece, and the modulation controller comprises:

means for generating a beam format modulation signal comprising a series of pulses, in accord with a pattern of the marks to be formed on the disk work piece; and means for dividing the pulses by a pre-determined number, to form sub-pulses;

means for controlling a duty cycle of the sub-pulses in accord with the radial distance, to form a beam modulating signal; and means for applying the beam modulating signal to modulate the exposure beam, while applying the modulated exposure beam to the surface of the disk.

* * * * *